No. 704,823. Patented July 15, 1902.
W. T. GORDON.
DRAPER, &c.
(Application filed Apr. 22, 1902.)
(No Model.)
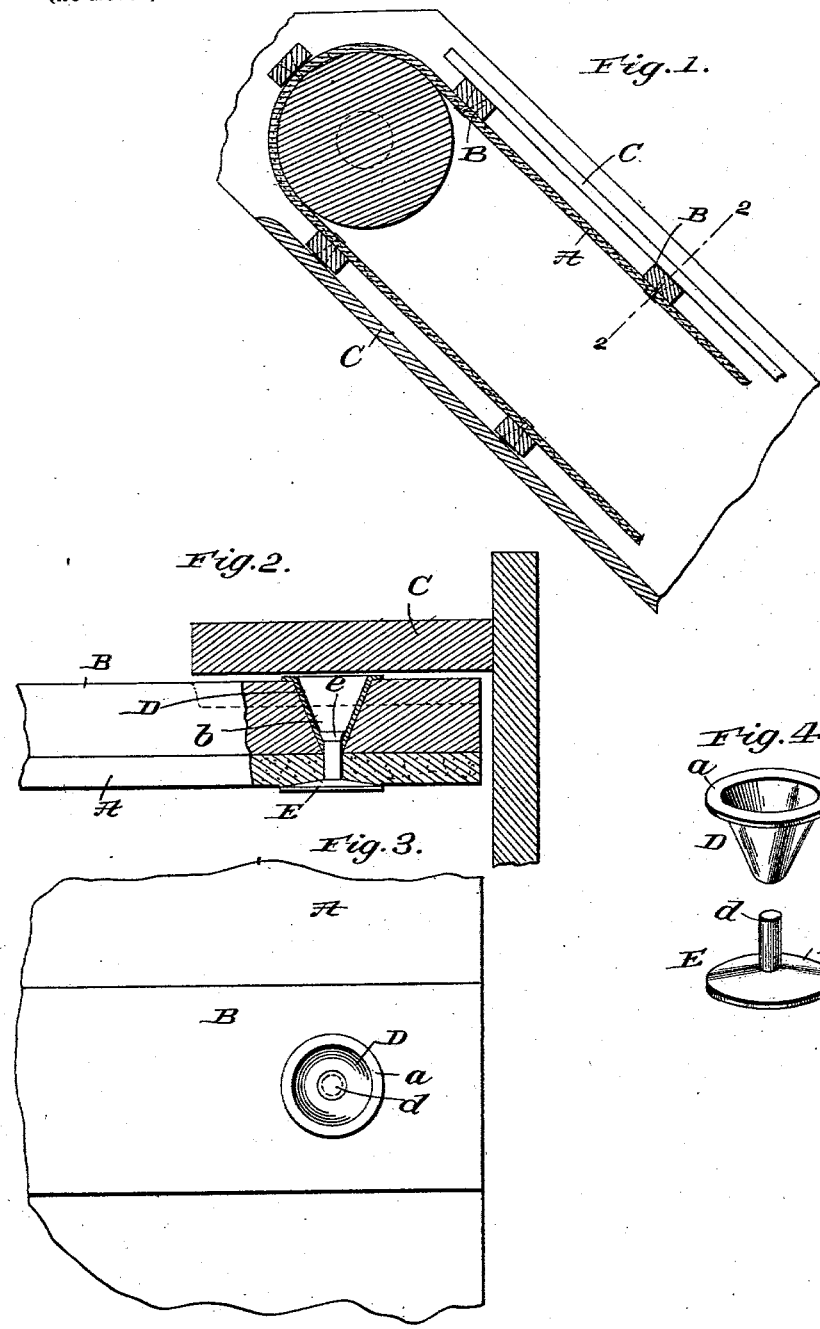

UNITED STATES PATENT OFFICE.

WALTER T. GORDON, OF JUNIPER, OREGON.

DRAPER, &c.

SPECIFICATION forming part of Letters Patent No. 704,823, dated July 15, 1902.

Application filed April 22, 1902. Serial No. 104,100. (No model.)

*To all whom it may concern:*

Be it known that I, WALTER T. GORDON, a citizen of the United States, residing at Juniper, in the county of Umatilla and State of Oregon, have invented new and useful Improvements in Drapers and the Like, of which the following is a specification.

My invention relates to drapers, straw-carriers, and other devices comprising belts and slats connected thereto, and more particularly to means for connecting the slats and belts.

It consists in a certain peculiar construction the novelty, utility, and advantages of which will be fully understood from the following description and claims when taken in conjunction with the accompanying drawings, in which—

Figure 1 is a detail longitudinal section of a draper in which the slats are connected to the belt in accordance with my invention; Fig. 2, an enlarged transverse section taken in the plane indicated by the broken line 2 2 of Fig. 1; Fig. 3, a detail plan illustrating a portion of the belt, one slat, and the tapered connecting device or member of my improved connection or fastener; and Fig. 4 disconnected perspective views of the fastener members comprised in the present and preferred embodiment of my invention.

Similar letters of reference designate corresponding parts in all of the several views of the drawings, referring to which—

A is a draper-belt; B B, slats, ordinarily of wood, disposed at suitable intervals on the belt; C C, runs against which the slats are designed to travel, and D E the members of my improved fasteners or connections, which are of copper or other metal. The fasteners or connections are similar in construction, and therefore a detailed description of the one shown in Figs. 2 to 4 will suffice to impart an understanding of all. The member D of the said fastener or connection is tapered—*i. e.*, reduced in size toward its inner end—and is preferably, although not essentially, hollow and provided at its outer end with a flange $a$. It is designed to rest in a correspondingly-tapered transverse aperture $b$ in the slat B, as best shown in Fig. 2, and be secured to the belt A, so as to connect the slat thereto. Any suitable means may be resorted to for securing the member D to the belt A, but I prefer to employ for the purpose the member E. Said member is in the form of a metallic rivet and has a head $c$ and a stem $d$. It is applied as shown in Fig. 2—that is, its head is disposed at the inner side of the belt A, while its stem is passed through the belt and into the reduced portion of the member D, where said stem is secured by upsetting its end, as indicated by $e$. The upsetting of the end of the rivet-stem is preferably effected through the medium of a punch introduced through the large end of the member D, and for this reason and also to render the fastening or connection light in weight I prefer to make said member D hollow, as before stated.

It will be readily appreciated from the foregoing that by virtue of my improvements the tight connection of a slat to a belt may be quickly and easily effected; also, that the connection is strong and durable and is calculated to securely hold the slat to the belt even when the slat is materially reduced in thickness by wear and a corresponding portion of the member D is worn away. This latter will be appreciated as a highly-important advantage when it is remembered that in practice the slats of drapers and the like are worn thin at their ends and the outer portions of the connections between the slats and belt are worn away against the runs C, with the result that when ordinary rivets with flat disks secured on their outer ends are employed to connect the slats and belt the connections between the slats and belt are destroyed after a short period of use and the slats become detached from the belt.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claims.

Having described my invention, what I claim, and desire to secure by Letters Patent, is—

1. The combination of a belt, a slat arranged on the belt, and having an aperture extending from its outer to its inner side, and tapered or reduced in size to said inner side, a correspondingly-tapered connecting device arranged in said aperture, and extending throughout the thickness of the slat, and secured at its inner end to the belt.

2. The combination of a belt, a slat arranged on the belt, and having an aperture extending from its outer to its inner side, and tapered or reduced in size to said inner side, and the connection comprising the hollow member exteriorly tapered to its inner end and open at its inner and outer ends; said hollow member being arranged in the said aperture of the slat and extending throughout the thickness of the latter, and a rivet having a head disposed at the inner side of the belt, and a stem passed through the belt and into the inner end of the hollow member, and secured in said inner end of the hollow member.

3. The combination in a draper or the like, of a run or runs, a belt, slats arranged on the belt so as to travel against the run or runs, and having apertures tapered or reduced in diameter toward the belt, and correspondingly-tapered connecting devices arranged in said apertures of the slats and secured to the belt.

In testimony whereof I have hereunto set my hand in presence of two subscribing witnesses.

WALTER T. GORDON.

Witnesses:
W. J. CRABILL,
GEO. REINECKE.